United States Patent
Mamba et al.

(10) Patent No.: US 8,081,168 B2
(45) Date of Patent: Dec. 20, 2011

(54) ON-SCREEN INPUT IMAGE DISPLAY SYSTEM

(75) Inventors: Norio Mamba, Kawasaki (JP); Tsutomu Furuhashi, Yokohama (JP); Toshiyuki Kumagai, Chigasaki (JP); Masayoshi Kinoshita, Oita (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 640 days.

(21) Appl. No.: 12/261,077

(22) Filed: Oct. 30, 2008

(65) Prior Publication Data

US 2009/0115742 A1    May 7, 2009

(30) Foreign Application Priority Data

Nov. 2, 2007   (JP) ................. 2007-285709

(51) Int. Cl.
  *G06F 3/044*   (2006.01)
  *G06F 3/045*   (2006.01)

(52) U.S. Cl. ....................... 345/173; 345/174
(58) Field of Classification Search .................. None
   See application file for complete search history.

(56) References Cited

U.S. PATENT DOCUMENTS

| | | | | |
|---|---|---|---|---|
| 5,438,168 A | * | 8/1995 | Wolfe et al. | 178/18.05 |
| 6,305,073 B1 | * | 10/2001 | Badders, Jr. | 29/622 |
| 6,506,983 B1 | * | 1/2003 | Babb et al. | 178/18.01 |
| 6,825,833 B2 | * | 11/2004 | Mulligan et al. | 345/174 |
| 2006/0092142 A1 | * | 5/2006 | Gillespie et al. | 345/173 |
| 2006/0267953 A1 | * | 11/2006 | Peterson et al. | 345/173 |
| 2007/0262966 A1 | | 11/2007 | Nishimura et al. | |
| 2009/0058818 A1 | * | 3/2009 | Chang et al. | 345/173 |

FOREIGN PATENT DOCUMENTS

JP    2006-146895    6/2006

* cited by examiner

*Primary Examiner* — Amare Mengistu
*Assistant Examiner* — Antonio Xavier
(74) *Attorney, Agent, or Firm* — Antonelli, Terry, Stout & Kraus, LLP.

(57) ABSTRACT

A detection resolution is improved in a display device that employs an electrostatic capacity coupling type touch panel provided with a transparent conductive film serving as a detection film. A plurality of electrode terminals (102) is provided such that at least three electrode terminals (102) are aligned in each side of a detection transparent conductive film (101). A touch panel control circuit is provided for selecting one of two to four numbers of electrode terminals from among the plurality of electrode terminals (102) of the detection transparent conductive film (101), applying an AC signal provided from a signal source (105) through a current detection resistor (r) (103), and then detecting a current that flows through each of the selected electrode terminals.

5 Claims, 12 Drawing Sheets

VIDEO SIGNAL       SYSTEM I/F

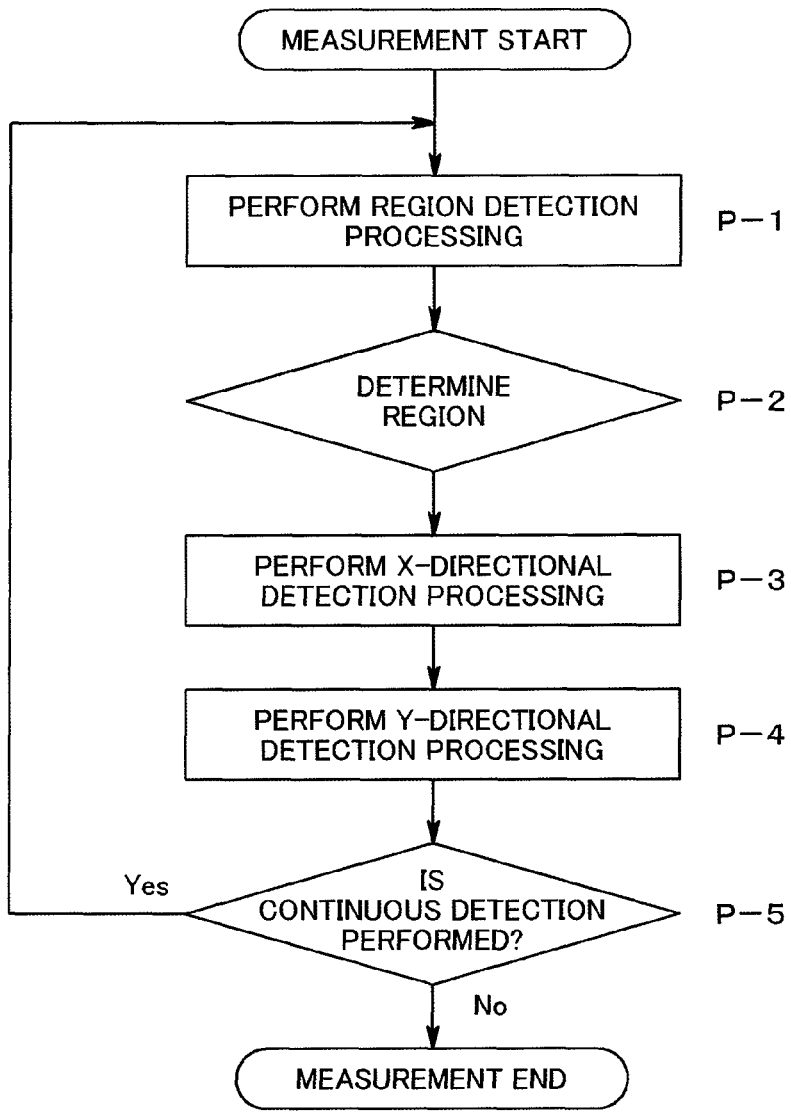

FIG.7A

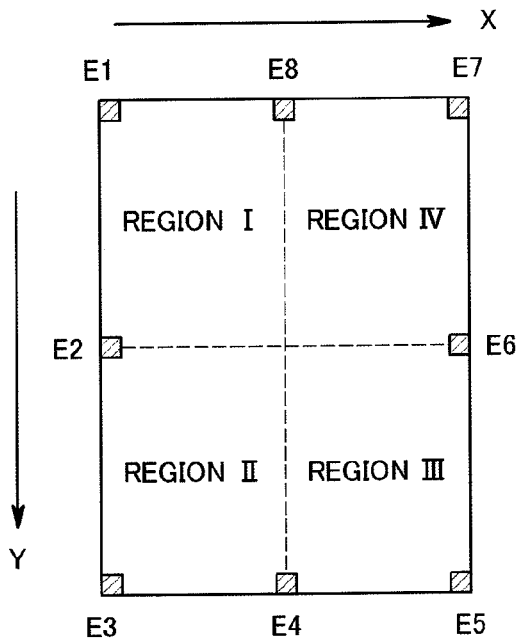

FIG.7B

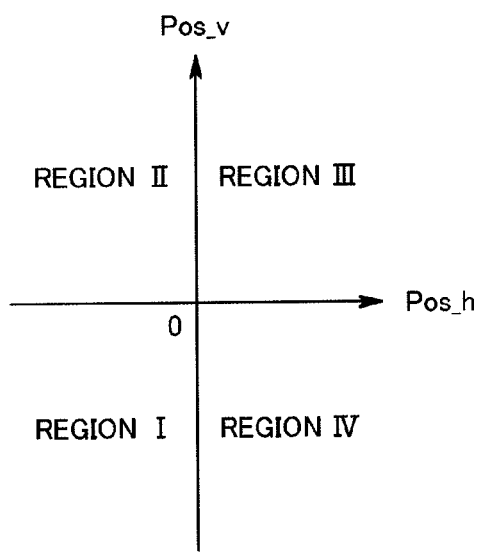

FIG.8

|  | X-DIRECTIONAL DETECTION PROCESSING | | Y-DIRECTIONAL DETECTION PROCESSING | |
| --- | --- | --- | --- | --- |
|  | SIGNAL CONTROL SWITCHES | DETECTION CONTROL SWITCHES | SIGNAL CONTROL SWITCHES | DETECTION CONTROL SWITCHES |
| REGION I | sw1,sw2, sw6,sw7 | swb,swd, swi,swk | sw1,sw3, sw4,sw8 | swb,swe, swg,swl |
| REGION II | sw2,sw3, sw5,sw6 | swc,swe, swh,swj | sw1,sw3, sw4,sw8 | swb,swe, swg,swl |
| REGION III | sw2,sw3, sw5,sw6 | swc,swe, swh,swj | sw4,sw5, sw7,sw8 | swf,swh, swk,swa |
| REGION IV | sw1,sw2, sw6,sw7 | swb,swd, swi,swk | sw4,sw5, sw7,sw8 | swf,swh, swk,swa |

FIG.11
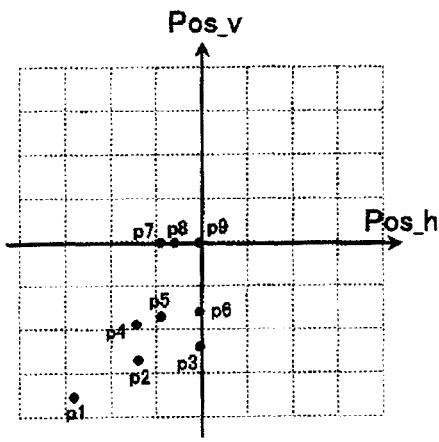
FIG.12
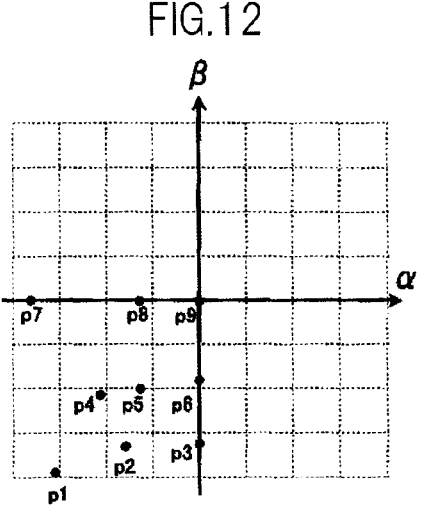
FIG.13
|  | X-DIRECTIONAL DETECTION PROCESSING | | Y-DIRECTIONAL DETECTION PROCESSING | |
| --- | --- | --- | --- | --- |
|  | SIGNAL CONTROL SWITCHES | DETECTION CONTROL SWITCHES | SIGNAL CONTROL SWITCHES | DETECTION CONTROL SWITCHES |
| NEAR BOUNDARY BETWEEN REGIONS (I, IV) AND (II, III) | sw2,sw6 | swd,swi | | |
| NEAR BOUNDARY BETWEEN REGIONS (I, II) AND (III, IV) | | | sw4,sw8 | swf,swa |

ON-SCREEN INPUT IMAGE DISPLAY SYSTEM

CROSS-REFERENCE TO RELATED APPLICATION

The present application claims priority from Japanese application JP2007-285709 filed on Nov. 2, 2007, the content of which is hereby incorporated by reference into this application.

BACKGROUND OF THE INVENTION

1. Field of the Invention

The present invention relates to an on-screen input image display device, in particular, an on-screen input image display system in which an electrostatic capacity coupling method is employed and uniform resolution is realized over a display screen.

2. Description of the Related Art

An image display device including a touch sensor (also referred to as touch panel) having an on-screen input function for inputting information to a display screen by a touch operation with a user's finger or the like (contact and press operation, hereinafter, simply referred to as "touch") is used for a mobile electronic device such as a PDA or a cellular phone, various home electric appliances, a stationary customer guiding terminal such as an automatic reception machine, and the like. As to the image display device having such a touch input function, there are some known methods including a method of detecting a change in resistance value or capacitance of a touched part, a method of detecting a change in quantity of light at the part shielded by the touch operation, and the like.

Of those, in an electrostatic capacity coupling method, a rear surface ITO in a display panel constituting a liquid crystal display device of in-plane switching (IPS) method can be used as a detection transparent conductive film for detecting an electrostatic capacity generated by a touch of a user's finger. Thus, this method is a promising candidate for a technology which realizes a touch panel at low cost.

An on-screen input display device of electrostatic capacity coupling method is disclosed in JP2006-146895 A. In JP2006-146895 A, for the purpose of implementing screen input, electrode terminals are provided at four corners of a detection transparent conductive film, and then an AC signal is applied through a current detection resistor. A parasitic capacitance and an electrostatic capacity (generated by a touch of a finger) in the detection transparent conductive film are charged and discharged with the AC signal. At that time, currents that flow through the individual electrode terminals at the four corners are determined, and then coordinate values are calculated from current ratios thereof. In this current detection, in order to reduce a noise caused by a driving signal for the display panel, a strobe signal is generated based on a liquid crystal driving timing, and the period under the noise influence is masked using this strobe signal. This permits noise reduction and improves detection accuracy.

SUMMARY OF THE INVENTION

In the invention disclosed in JP 2006-146895 A, charging and discharging are performed through the electrode terminals at the four corners of the detection transparent conductive film. Thus, an impedance difference between the individual terminals to a touch position of a finger (position where an electrostatic capacity is formed) decreases when the location of contact of the finger approaches the center. Thus, a difference between currents detected through the individual terminals also decreases. Here, coordinate values are calculated from current ratios. Thus, in the vicinity of the center of the detection transparent conductive film which is distant from the terminals at the four corners, the ranges of values calculated from the current ratios are small, and hence the resolution is reduced.

It is therefore an object of the present invention to improve detection resolution in a display device that employs an electrostatic capacity coupling type touch panel provided with a transparent conductive film serving as a detection film.

In order to achieve the above-mentioned object, in the present invention, a plurality of electrode terminals are provided such that at least three electrode terminals are aligned in each side of a detection transparent conductive film in an electrostatic capacity coupling type touch panel. Then, a touch panel control circuit is provided for selecting one of two to four numbers of electrode terminals from among the plurality of electrode terminals of the detection transparent conductive film, applying an AC signal provided through a current detection resistor (r), and then detecting a current that flows through each of the selected electrode terminals.

Since a plurality of terminals are provided in each side of the detection transparent conductive film, (one of two to) four numbers of electrode terminals that surround the location of contact of the finger can be selected such that higher current differences should be obtained even when the location of contact of a user's finger is near the center (e.g., in a region within a predetermined distance from the center point). Further, even when the location of contact of an electrostatic capacity (finger) is near the center, wider ranges of current ratios are obtained, and hence the coordinate resolution is improved. Even when current detection of this region division method is employed, the detection time can be reduced by controlling the to-be-detected region compared with the preceding coordinate detection result. This realizes at low cost a touch panel having a short sampling period and a high resolution.

BRIEF DESCRIPTION OF THE DRAWINGS

These and other features, objects and advantages of the present invention will become more apparent from the following description when taken in conjunction with the accompanying drawings wherein:

FIG. 5 is a flow chart of control performed by an operation control section illustrated in FIG. 3 according to the first embodiment of the present invention;

FIG. 6 is a table showing switches in the current detection control section which are selected (brought into an ON state) by the operation control section when region detection processing shown in FIG. 5 is performed;

FIGS. 7A and 7B are diagrams each for describing a definition of regions in the region detection processing;

FIG. 8 is a summary table of switch control performed by the current detection control section in a case where X-directional detection processing and Y-directional detection processing are performed in accordance with a flow chart shown in FIG. 5;

FIG. 11 illustrates results of simulation for detection results of the region detection processing in a case where a user's finger contacts each point illustrated in FIG. 9;

FIG. 12 is an explanatory diagram showing a summary of detection results α and β of the X-directional detection processing and the Y-directional detection processing corresponding to each point illustrated in FIG. 9, calculated from simulations;

FIG. 13 is a table showing terminal selection operation in a case where (Pos_h, Pos_v) is located near a boundary (line formed by joining terminals E2 and E6 of FIG. 9) between regions I and IV and regions II and III, and in a case where (Pos_h, Pos_v) is located near a boundary (line formed by joining terminals E4 and E8 of FIG. 9) between regions I and II and regions III and IV, in region determination according to the first embodiment of the present invention;

FIG. 16A is a diagram illustrating a region formed by calculated values α and β', while

DETAILED DESCRIPTION OF THE INVENTION

The best mode of the present invention is described below in detail with reference to the drawings illustrating embodiments in which the present invention is applied to a display device employing a liquid crystal panel.

First Embodiment

Figure 1:
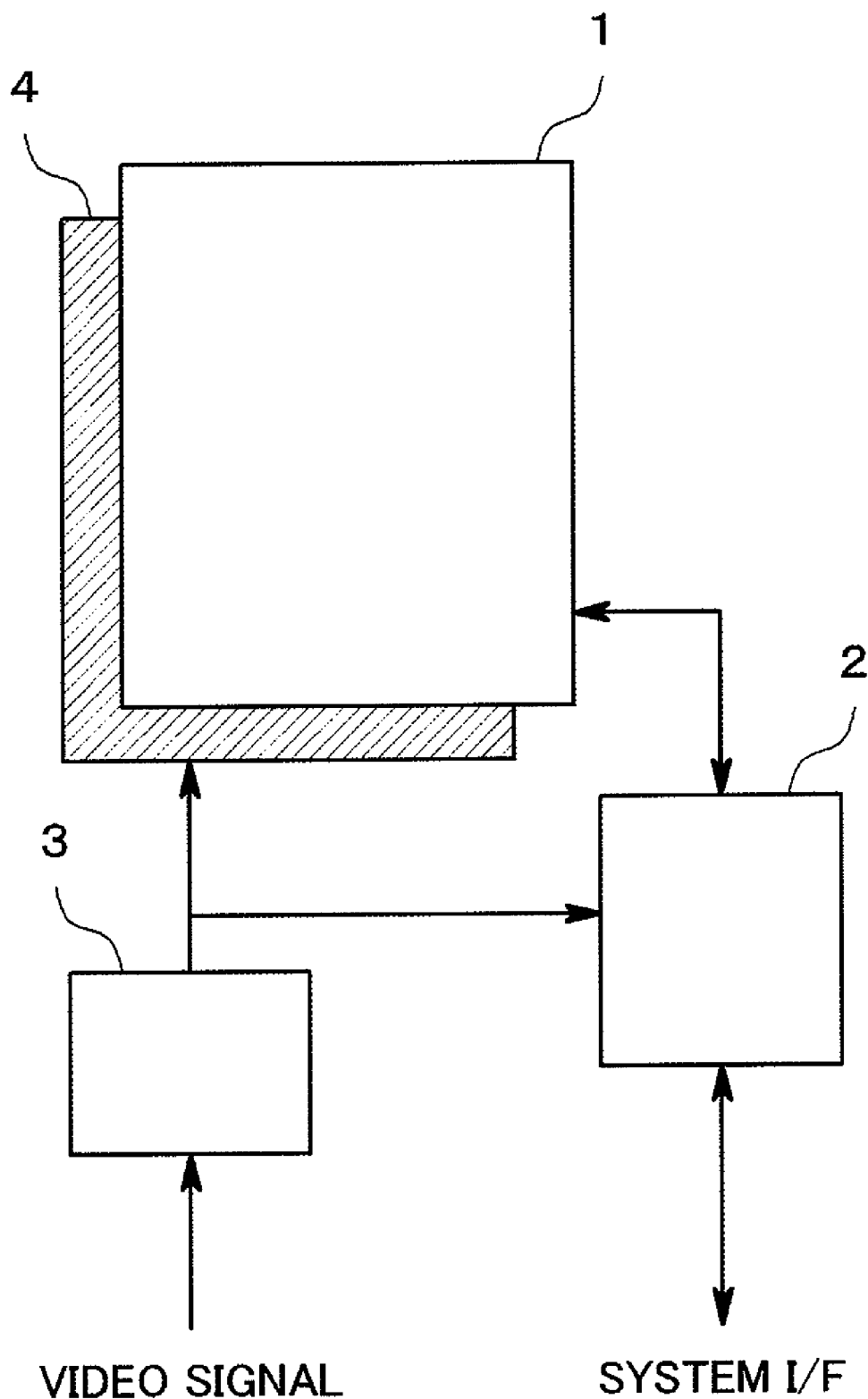
FIG. 1 is a configuration diagram illustrating an on-screen input display device according to a first embodiment of the present invention.

FIG. 1 is a configuration diagram illustrating an on-screen input display device according to a first embodiment of the present invention. This on-screen input display device has a display panel (liquid crystal panel, in this example) 4 and a touch panel 1. The touch panel 1 is stacked on a display image screen of the display panel 4. The display panel 4 is controlled by a display control circuit 3 so as to display a video signal transferred from a host computer or a video signal source which are not illustrated. Further, the touch panel 1 is controlled by a touch panel control circuit 2. Similarly to the related art, the touch panel control circuit 2 receives a liquid crystal driving signal from the display control circuit 3, and performs noise reduction processing.

Further, the touch panel control circuit 2 transmits coordinate data to a control system of the main body through a system interface (system I/F), and receives information concerning the driving such as a detection region and a detection timing for a touch, from the control system. Here, the coordinate data may be not-yet-corrected data or data of detected current ratios.

Figure 2:
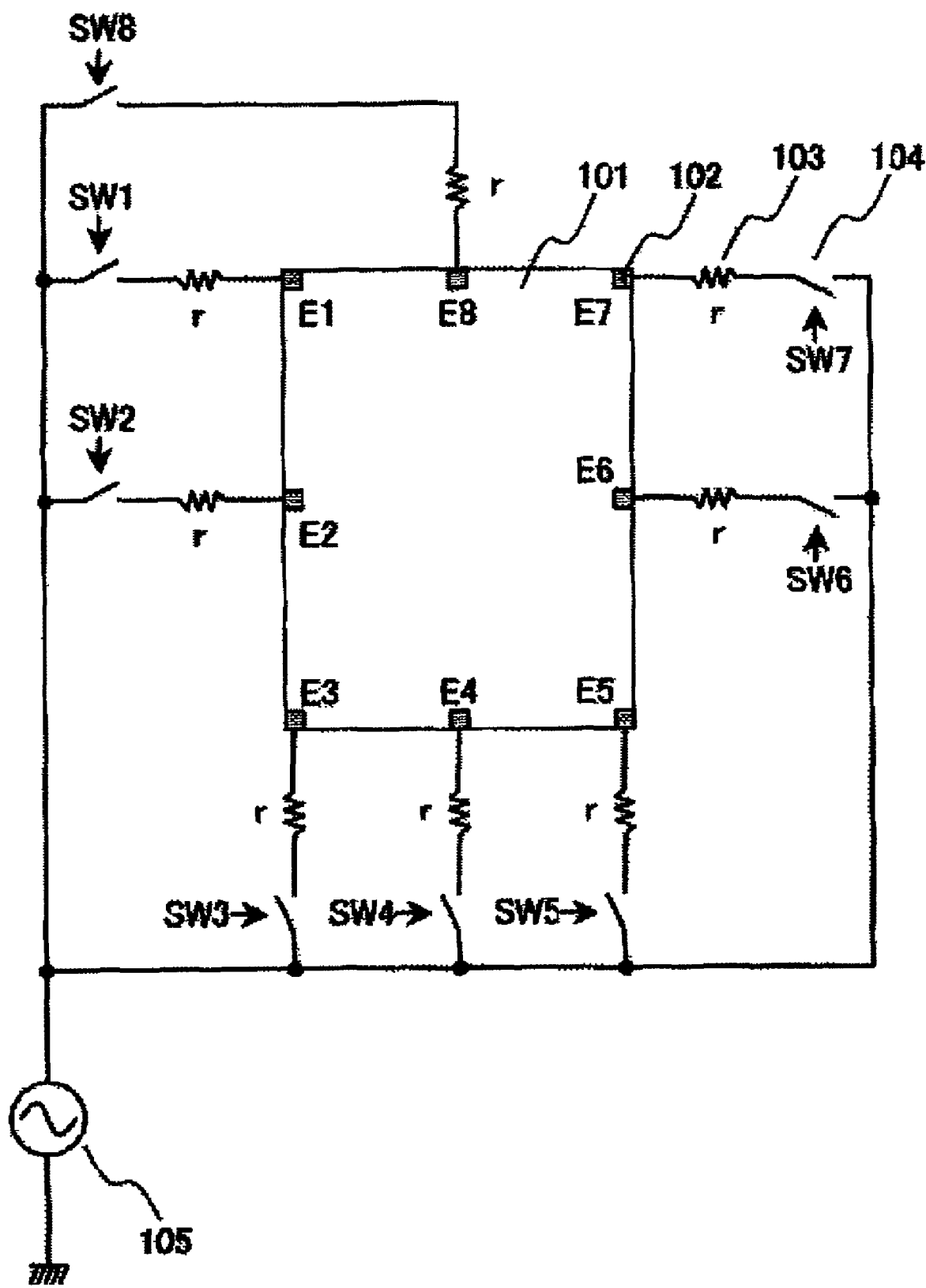
FIG. 2 is a schematic diagram illustrating a configuration of a detection transparent conductive film of a touch panel and a plurality of electrode terminals arranged therearound in the on-screen input display device according to the first embodiment of the present invention.

FIG. 2 is a schematic diagram illustrating the configuration of a detection transparent conductive film of a touch panel and a plurality of electrode terminals arranged therearound in the on-screen input display device according to the first embodiment of the present invention. In this embodiment, electrode terminals (collectively denoted by reference numeral 102) are arranged at the four corners (e.g., regions outside a predetermined distance from the center point) of a rectangular detection transparent conductive film 101 and the center portions (e.g., region within a predetermined distance from the center point) of the individual sides thereof, and hence three electrodes are arranged per side. However, the number of electrode terminals arranged per side is not limited thereto. That is, more than three electrode terminals may be arranged. Each of electrode terminals E1 to E8 is connected to a signal source 105 via a current detection resistor (r) 103 and each of signal control switches (SW1 to SW8) 104. Here, the current detection resistors (r) 103 and the signal control switches (SW1 to SW8) 104 are included in a current detection control section 201 illustrated in FIG. 3 described later.

Figure 3:
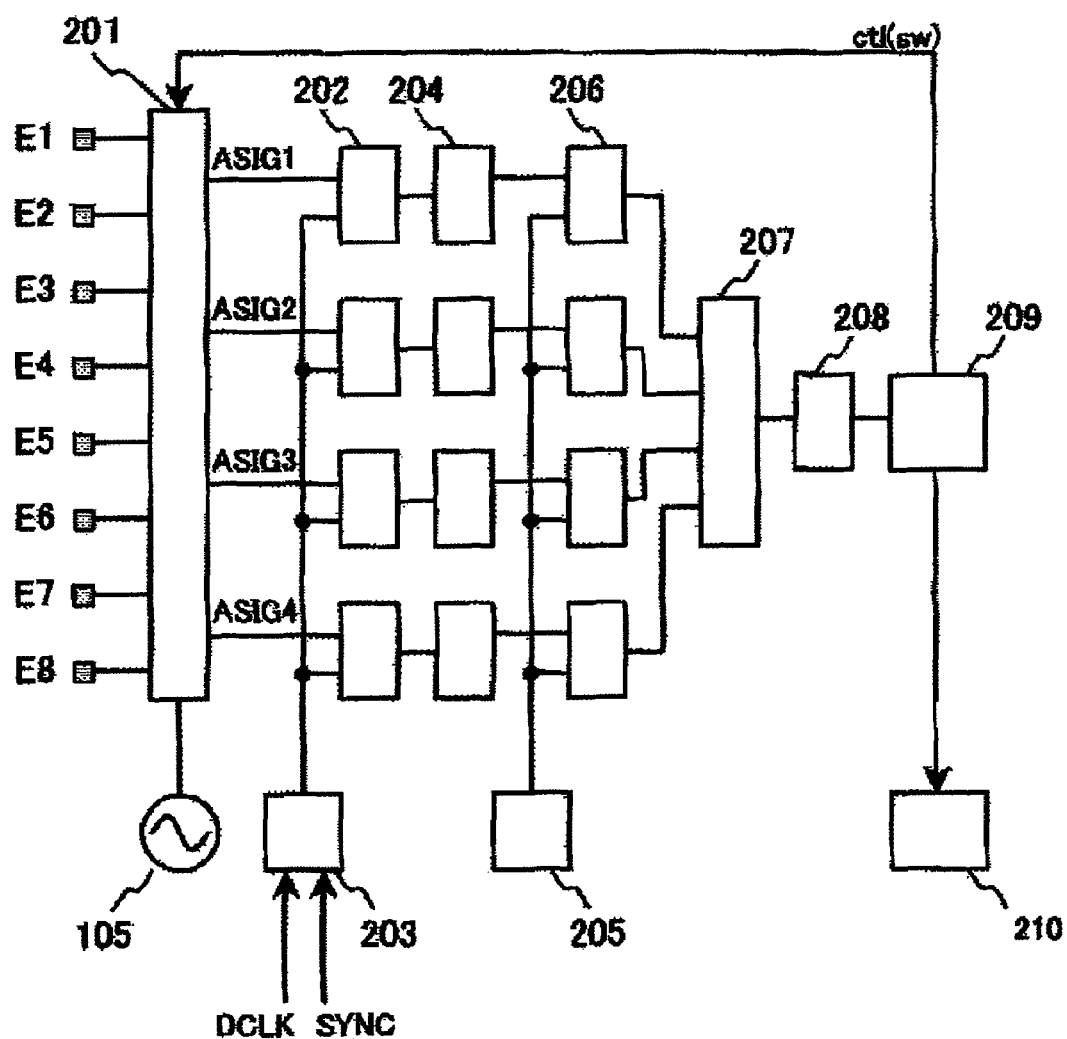
FIG. 3 is a configuration diagram of a touch panel control circuit illustrated in FIG. 1.

FIG. 3 is a configuration diagram of the touch panel control circuit 2 illustrated in FIG. 1 according to the first embodiment of the present invention. The current detection control section 201 selects four electrode terminals from the plurality (eight, in this example) of the electrode terminals E1 to E8, and then detects the currents (ASIG1, ASIG2, ASIG3, and ASIG4) that flow through the selected electrode terminals. After that, a noise reduction section 202, a filtering detection section 204, a sample hold section 206, an analog multiplexer 207, and an AD conversion section 208 convert each detected current into digital data to perform signal processing. From the AD conversion section 208 at the preceding stage, an operation control section 209 receives the values of currents that flow through the four selected electrode terminals, in the form of a digital signal. Then, in accordance with this result, the operation control section 209 outputs a control signal ctl (sw) for controlling the individual switches (SW1 to SW8 of FIG. 2) of the current detection control section 201. From a pixel clock DCLK and a vertical/horizontal synchronization signal SYNC of the video signal, a strobe signal generating section 203 generates an operation timing signal for the noise reduction section 202. A hold signal generating section 205 generates a hold control signal for the sample hold section 206.

The operation control section 209 controls the individual switches SW1 to SW8 to thereby output to a processing section a detection result a relevant to an X coordinate and a detection result β relevant to a Y coordinate. The processing section 210 performs higher-order compensation processing when necessary, and then converts the detection results into an X coordinate and a Y coordinate. The quantities α and β are described later.

Figure 4:
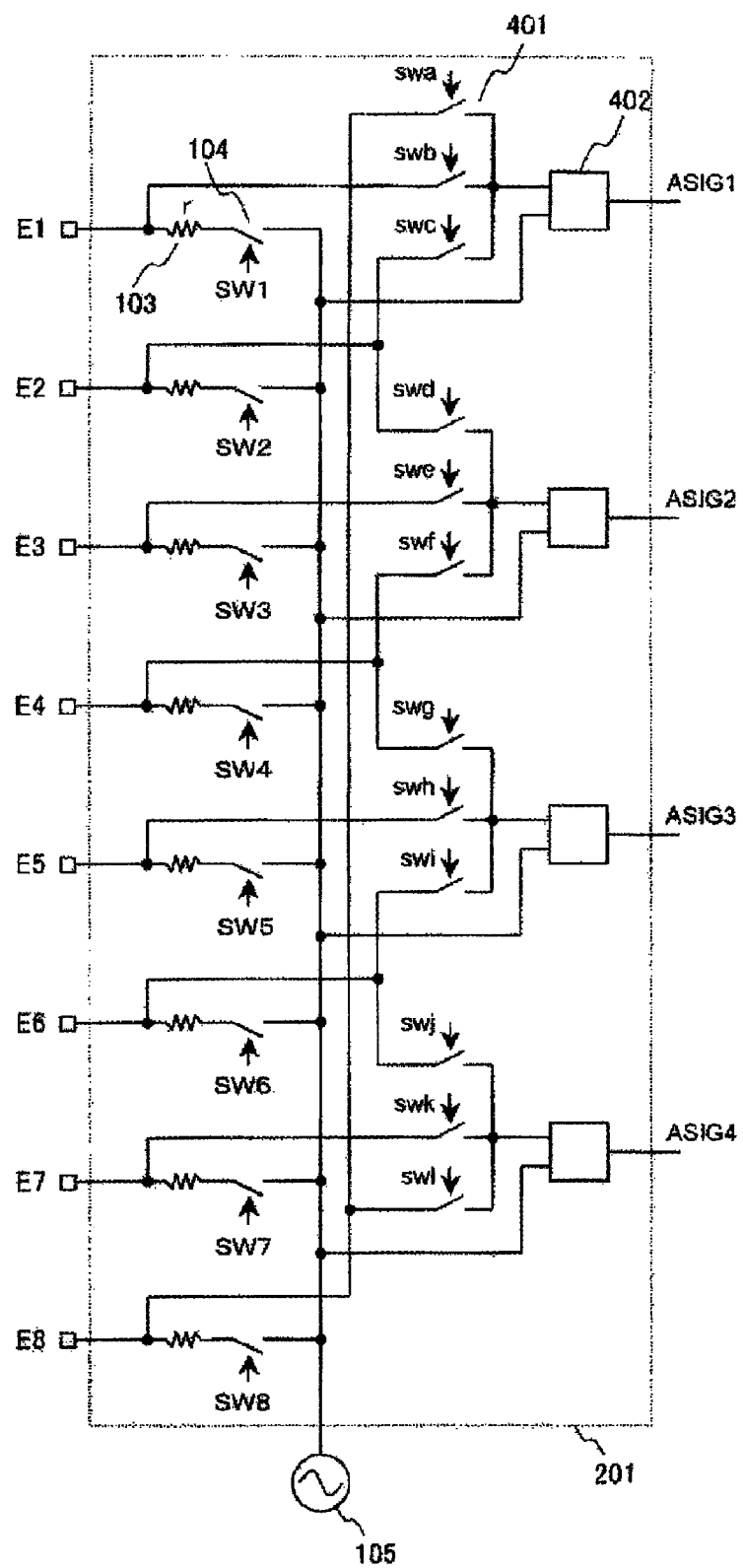
FIG. 4 is a block diagram illustrating a configuration of a current detection control section illustrated in FIG. 3.

FIG. 4 is a block diagram illustrating the configuration of the current detection control section 201 illustrated in FIG. 3. Like parts to those of FIGS. 1 to 3 are denoted by like reference numerals. The current detection control section 201 includes: four current detection sections 402; signal control switches (SW1 to SW8) 104 for selecting up to four electrode terminals from among the plurality (eight, in this example) of the electrode terminals E1 to E8 and then applying an AC signal thereto; and detection control switches (swa to swl) 401 for detecting the currents that flow from the electrode terminals selected by the signal control switches (SW1 to SW8) 104 in the individual current detection sections 402.

The currents detected by the current detection sections 402 are transferred as analog signals ASIG1 to ASIG4 to the subsequent circuit (noise reduction sections 202), and then converted into digital signals.

FIG. 5 is a flow chart of control performed by the operation control section 209 illustrated in FIG. 3 according to the first embodiment of the present invention. The operation control section 209 receives a coordinate detection command from the system, and then starts determination. In this embodiment, the determination is performed in two separate periods of: a period of region detection processing (P-1 and P-2) in which a region where a contact position of a finger is located is determined; and a period of coordinate detection (P-3 and P-4) in which electrode terminals are selected in accordance with the region identified in the region detection processing and then X-directional detection processing and Y-directional detection processing are performed. When the coordinate detection is to be performed continuously (P-5), the region detection processing is performed again, and then similar operation is repeated further.

FIG. 6 is a summary table showing switches selected (brought into an ON state) by the operation control section 209 from among the switches (SW1 to SW8) and (swa to swl) of the current detection control section 201 when the region detection processing shown in FIG. 5 is performed. The current detection control section 201 controlled by the operation control section 209 of FIG. 3 selects those switches, and then applies an AC signal through the electrode terminals E1 to E8 provided at the four corners of the detection transparent conductive film, to thereby detect the currents.

When the currents that flow through the individual terminals E1, E3, E5, and E7 at the four corners are referred to as $i1$, $i3$, $i5$, and $i7$, respectively, values Pos_h and Pos_v calculated from the following formulae 1 and 2 are used in the region determination processing (P-2) of FIG. 5.

$$\text{Pos\_}h = (i5+i7)/(i1+i3+i5+i7) - A \quad \text{Formula 1}$$

$$\text{Pos\_}v = (i3+i5)/(i1+i3+i5+i7) - B \quad \text{Formula 2}$$

Here, A is a coefficient for correction such that, in the case of the electrode terminal arrangement illustrated in FIG. 2, Pos_h should be equal to zero when a finger contacts the center part of the detection transparent conductive film. Similarly, B is a coefficient for correction such that Pos_v should be equal to zero. In the following description, the currents that flow through the individual terminals E1 to E8 are denoted by $i1$ to $i8$.

FIGS. 7A and 7B are diagrams each for describing a definition of regions in the region detection processing. FIG. 7A is a diagram, in which, in the case of the electrode terminal arrangement illustrated in FIG. 2, four divided regions (regions I, II, III, and IV) are defined that are formed by dividing with electrode terminal pairs (E2 and E6) and (E4 and E8) each arranged at the middle points of two sides facing each other. Here, for example, the X coordinate is defined as the horizontal direction (from E1 terminal to E7 terminal), while the Y coordinate is defined as the vertical direction (from E1 terminal to E3 terminal). Further, FIG. 7B illustrates an example of definition of the indices in the region determination processing in the flow of FIG. 5.

On the basis of the values Pos_h and Pos_v calculated from the current values acquired in the region detection processing, the region is determined as follows. It should be noted that the following definition of region determination is an example. That is, Pos_h>0 and Pos_v>0 ⇒ region III
Pos_h>0 and Pos_v≦0 ⇒ region IV
Pos_h≦0 and Pos_v≦0 ⇒ region I
Pos_h≦0 and Pos_v>0 ⇒ region II FIG. 8 is a summary table of switch control performed by the current detection control section in a case where the X-directional detection processing and the Y-directional detection processing are performed in accordance with the flow chart illustrated in FIG. 5. In accordance with a region (region I to region IV) determined in the region detection processing, a diverse combination of signal control switches and detection control switches that are to be brought into an ON state is used in the X-directional detection processing and the Y-directional detection processing.

In the X-directional detection processing, from among a plurality of electrode terminals located in the two sides facing each other in the vertical direction, electrode terminals are selected such that the determined region should be included. Thus, when it is determined as the regions I and IV, the terminals E1, E2, E6, and E7 are selected. When it is determined as the regions II and III, the terminals E2, E3, E5, and E6 are selected.

On the other hand, in the Y-directional detection processing, from among a plurality of electrode terminals located in the two sides facing each other in the horizontal direction, electrode terminals are selected such that the determined region should be included. Thus, when it is determined as the regions I and II, the terminals E1, E3, E4, and E8 are selected. When it is determined as the regions III and IV, the terminals E4, E5, E7, and E8 are selected.

In the X-directional detection processing, the value α related to the X coordinate is calculated from Formula 3 (in the case of regions I and IV) or Formula 4 (in the case of regions II and III).

$$\alpha = (i6+i7)/(i1+i2+i6+i7) - A1 \quad \text{Formula 3}$$

$$\alpha = (i5+i6)/(i2+i3+i5+i6) - B1 \quad \text{Formula 4}$$

Further, in the Y-directional detection processing, the value β related to the Y coordinate is calculated from Formula 5 (in the case of regions I and II) or Formula 6 (in the case of regions III and IV).

$$\beta = (i3+i4)/(i1+i3+i4+i8) - A2 \quad \text{Formula 5}$$

$$\beta = (i4+i5)/(i4+i5+i7+i8) - B2 \quad \text{Formula 6}$$

Here, A1, A2, B1, and B2 are correction coefficients set up such that the values α and β should respectively be equal to zero when a finger contacts the center part of the detection transparent conductive film.

Figure 9:
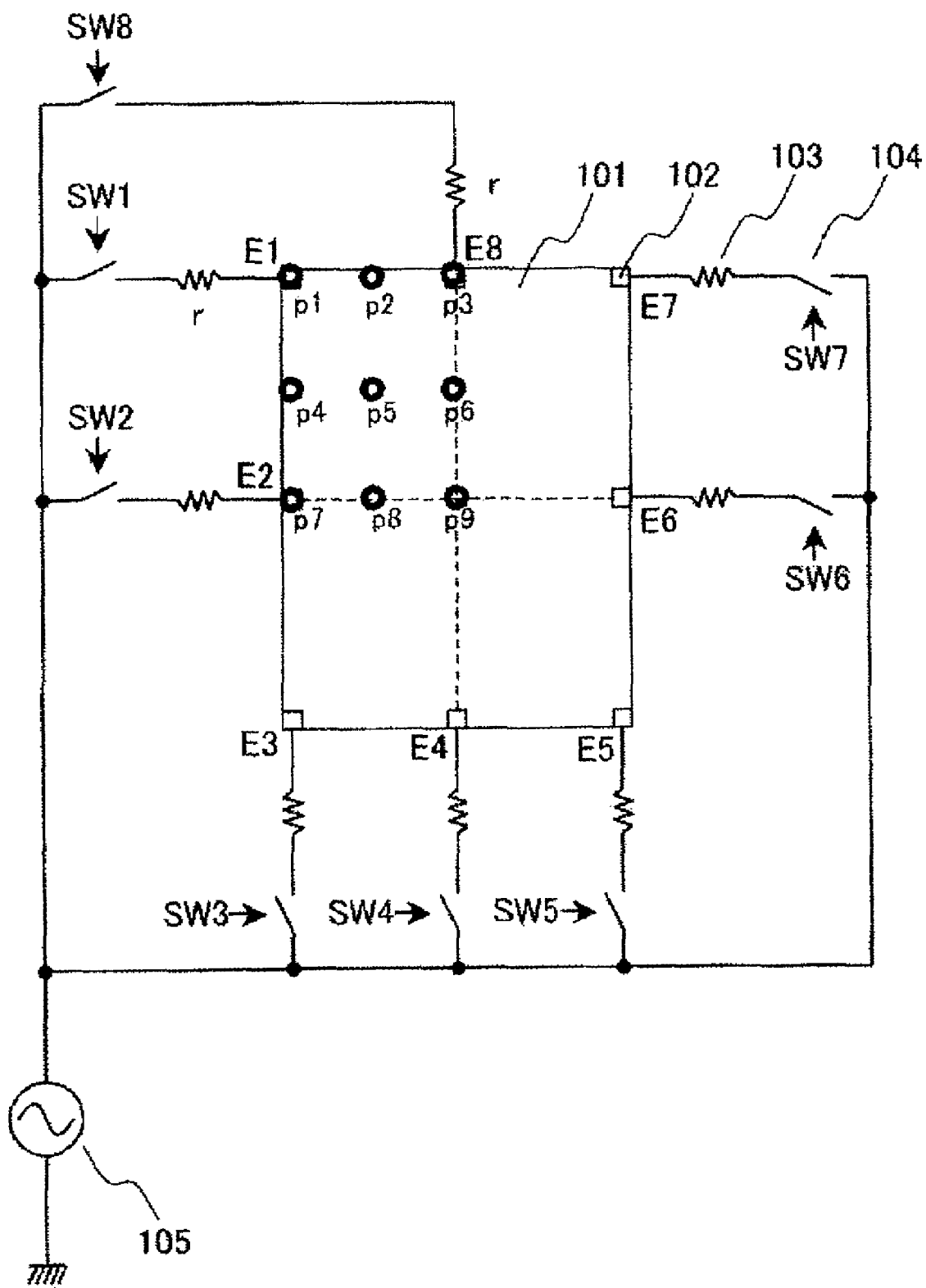
FIG. 9 is a schematic diagram illustrating locations of contact of a user's finger in a region I of the detection transparent conductive film.

FIG. 9 is a schematic diagram illustrating locations of contact of a user's finger in the region I of the detection transparent conductive film. Three by three points (p1 to p9) are set up horizontally and vertically in the region I. Then, operation and a detection result are described below with reference to FIGS. 10 to 12 in a case where a finger contacts any one of the nine points.

Figure 10:
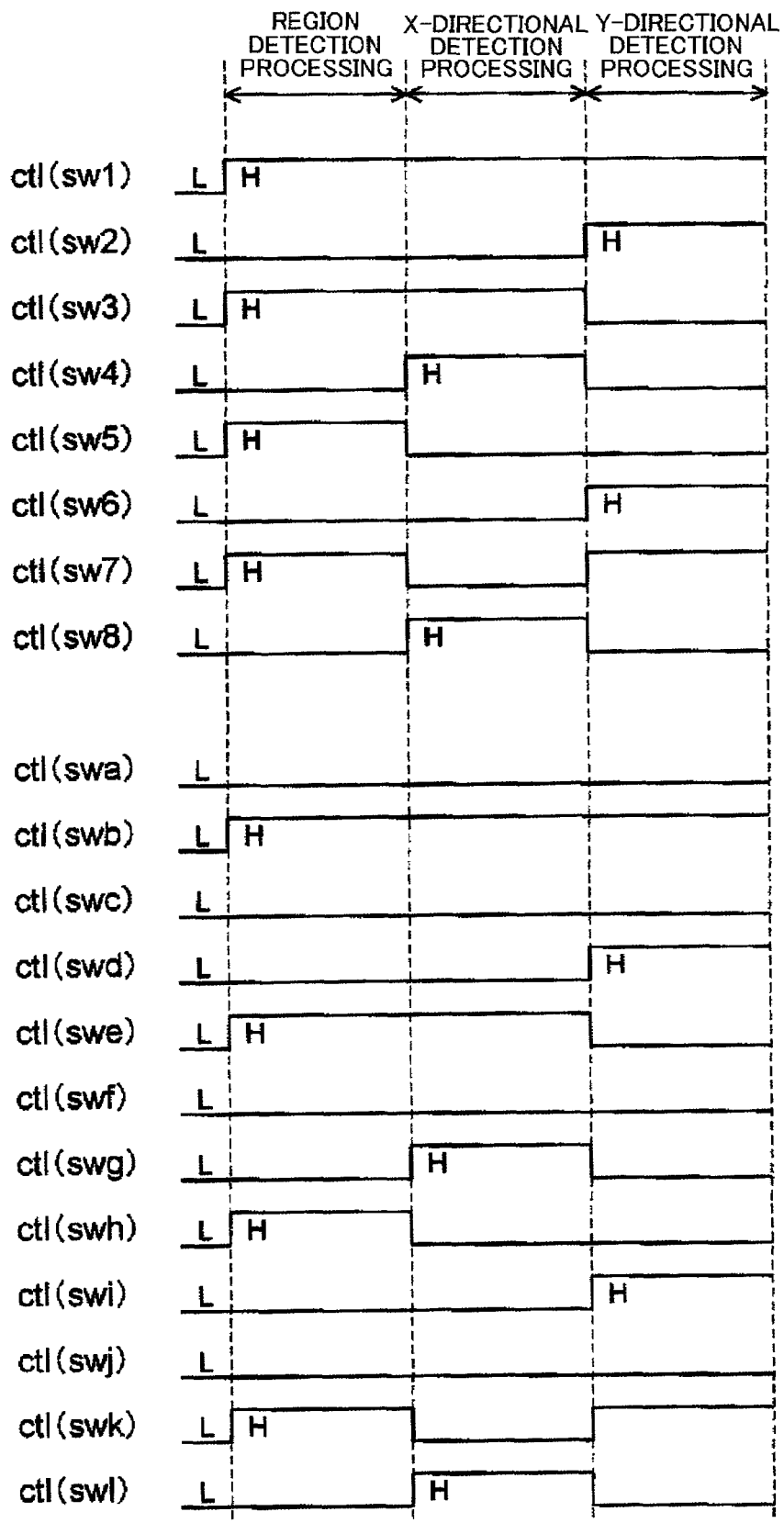
FIG. 10 is a timing chart showing operation of the switches included in the current detection control section in a case where a user's finger contacts the region I as illustrated in FIG. 9.

FIG. 10 is a timing chart showing operation of switches included in the current detection control section in a case where a user's finger contacts the region I as illustrated in FIG. 9. Here, a high level (H) indicates that the switch goes into an ON state, while a low level (L) indicates that the switch goes into an OFF state. In the timing chart of FIG. 10, first, a region is determined in the region detection processing. After that, as shown in FIG. 8, the operation control section 209 generates a control signal so that the X-directional detection processing and the Y-directional detection processing are performed.

FIG. 11 is a result of simulation for a detection result of the region detection processing in a case where a user's finger contacts each point illustrated in FIG. 9, one point at a time. When Pos_h and Pos_v are calculated for each point by using Formulas 1 and 2, Pos_h≦0 and Pos_v≦0 hold for each point. Accordingly, as a result of determination according to FIG. 7B, each location is determined as belonging to the region I.

FIG. 12 is an explanatory diagram illustrating a summary of detection results $\alpha$ and $\beta$ of the X-directional detection processing and the Y-directional detection processing corresponding to each location illustrated in FIG. 9, calculated from simulations. As illustrated in FIG. 12, the ranges of $\alpha$ and $\beta$ can be increased even near the center of the display panel. This can improve the resolutions in the coordinates (X, Y) calculated from Formulas 7 and 8.

$$X = k1 + k2 \times \alpha \quad \text{Formula 7}$$

$$Y = k1 + k2 \times \beta \quad \text{Formula 8}$$

Here, k1 is an offset adjustment coefficient, while k2 is a magnification adjustment coefficient. These coefficients do not depend on the impedance of the user's finger. Further, when a still higher precision is required, a higher-order correction calculation may be performed.

FIG. 13 is a table showing terminal selection operation in a case where (Pos_h, Pos_v) is located near the boundary (line formed by joining terminals E2 and E6 of FIG. 9) between the regions I and IV and the regions II and III, and in a case where (Pos_h, Pos_v) is located near the boundary (line formed by joining terminals E4 and E8 of FIG. 9) between the regions I and II and the regions III and IV, in the region determination according to the first embodiment of the present invention. In a case where the location of contact is near a boundary line, when detection is performed in a state in which two electrode terminals are selected as shown in the table of FIG. 13, the individual values $\alpha$ and $\beta$ can be obtained. The formulas to be used at this time are shown as Formulas 9 and 10.

$$\alpha = i6/(i2+i6) - A3 \quad \text{Formula 9}$$

$$\beta = i4/(i4+i8) - B3 \quad \text{Formula 10}$$

After the determination processing, detection is performed again for all the coordinates in the first detection period so that a contact position is detected. As such, in addition to the four processing methods for the regions I to IV shown in FIG. 8, the processing of detecting the coordinates near a region boundary as shown in FIG. 13 may be added after the region determination of the flow illustrated in FIG. 5.

According to the first embodiment, the on-screen input display device is provided in which the detection resolution is improved in the electrostatic capacity coupling type touch panel that employs the transparent conductive film serving as the detection film.

Second Embodiment

Figure 14:
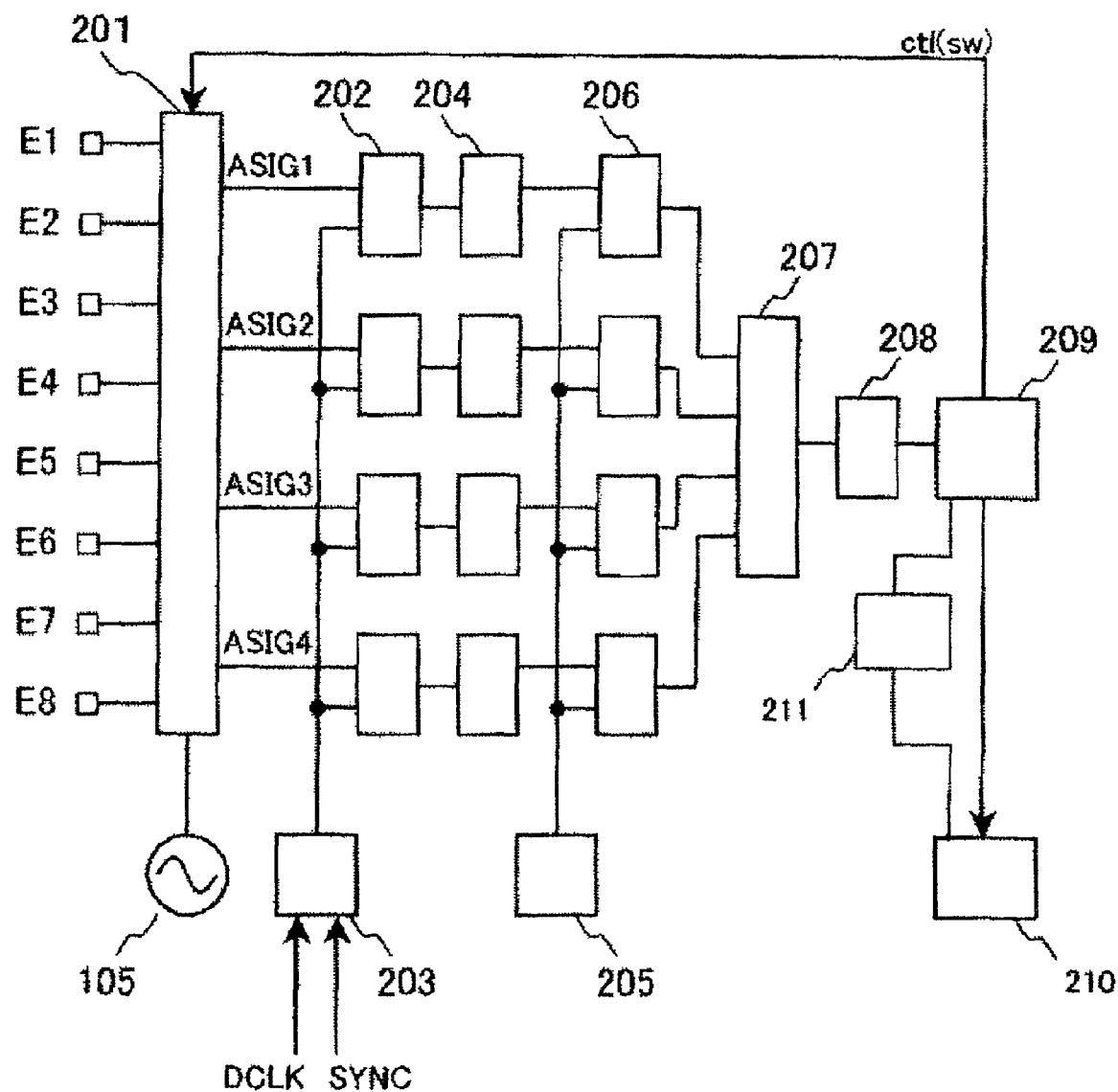
FIG. 14 is a configuration diagram of a touch panel control circuit illustrated in FIG. 1 according to a second embodiment of the present invention.
Figure 15:
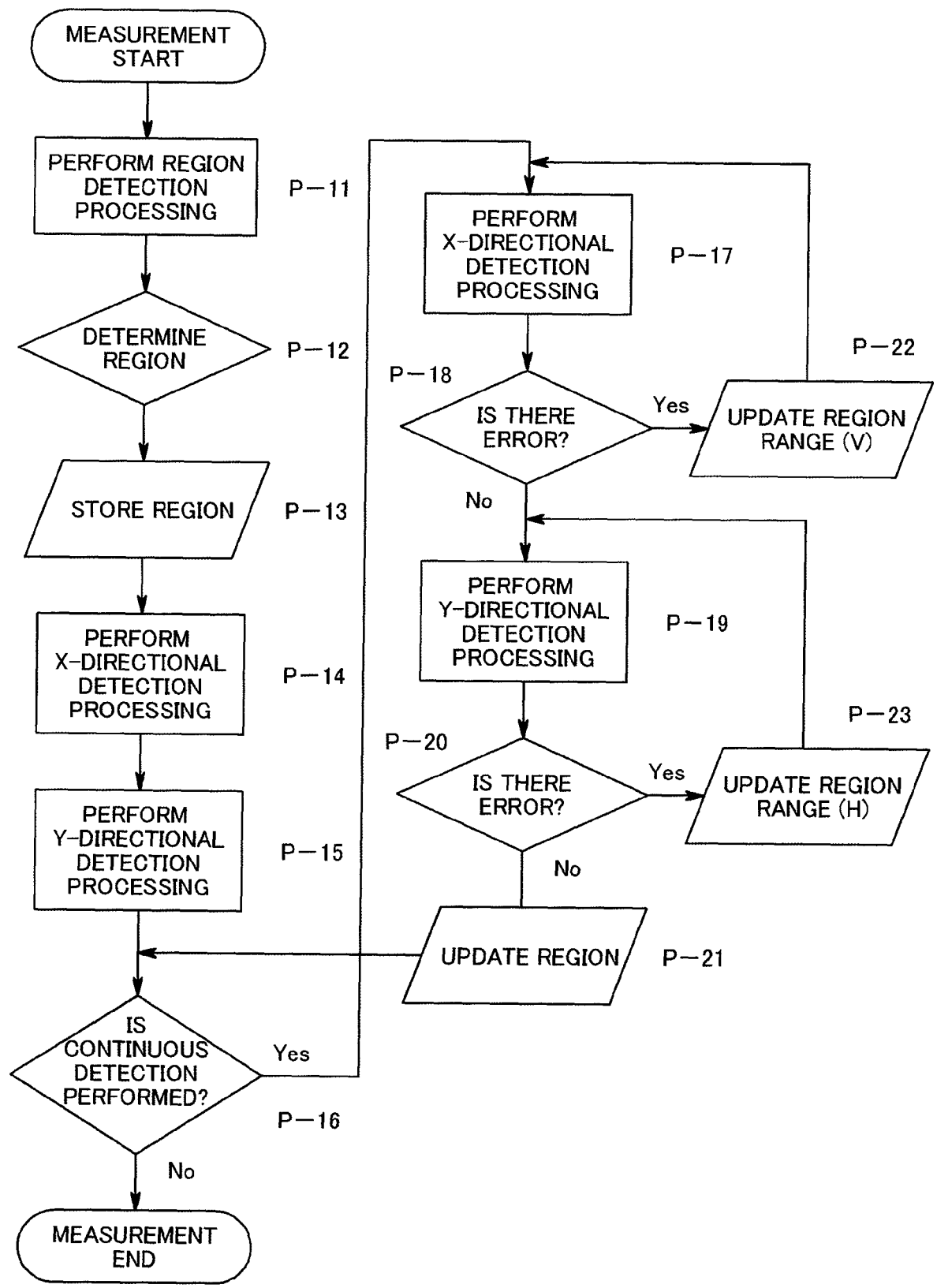
FIG. 15 is a flow chart of control performed by the operation control section illustrated in FIG. 3 according to the second embodiment of the present invention.

An on-screen input display device according to a second embodiment of the present invention is described below with reference to FIGS. 14 to 16. FIG. 14 is a configuration diagram of a touch panel control circuit illustrated in FIG. 1 according to the second embodiment. The difference from the touch panel control circuit of FIG. 3 according to the first embodiment is that a region storage section 211 is provided for storing a region determination result. The other points in the configuration are similar to those of FIG. 3. Hence, their description is omitted. In the second embodiment, the operation control section illustrated in FIG. 3 performs control according to a different control flow. FIG. 15 is a flow chart of the operation control section illustrated in FIG. 3 according to the second embodiment. In FIG. 15, when a coordinate detection command is transferred from the system (measurement start), similarly to the first embodiment, region detection processing is performed first so that a region is determined (P-11 and P-12). In the second embodiment, after the region determination, the determination result is stored into the region storage section 211 (P-13).

After that, X-directional detection processing (P-14) and Y-directional detection processing (P-15) are performed so that the currents are detected and then the coordinates (X, Y) are obtained. When continuous detection is set up by the system (P-16), the region determination result of the preceding coordinates (X, Y) detection is read from the region storage section 211. Then, in accordance with the region, X-directional detection processing is performed (P-17). For example, when the preceding contact position is located in the region I as illustrated in FIG. 9, detection corresponding to the region I is performed according to the table of FIG. 8.

In this case, for the purpose of determination whether or not the position of the newly detected coordinates has moved to the outside (regions II and III) of the Y coordinate range of the region I, a new value $\beta'$ calculated from Formula 11 (in the case of regions I and IV) is used.

$$\beta' = (i2+i6)/(i1+i2+i6+i7) - A4 \quad \text{Formula 11}$$

Figure 16A:
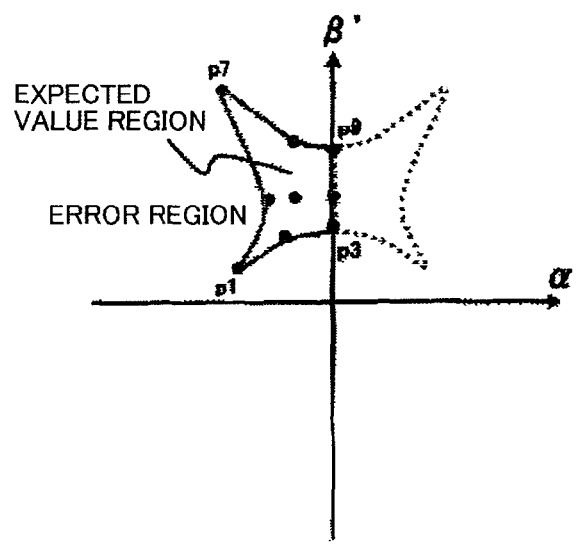
Figure 16B:
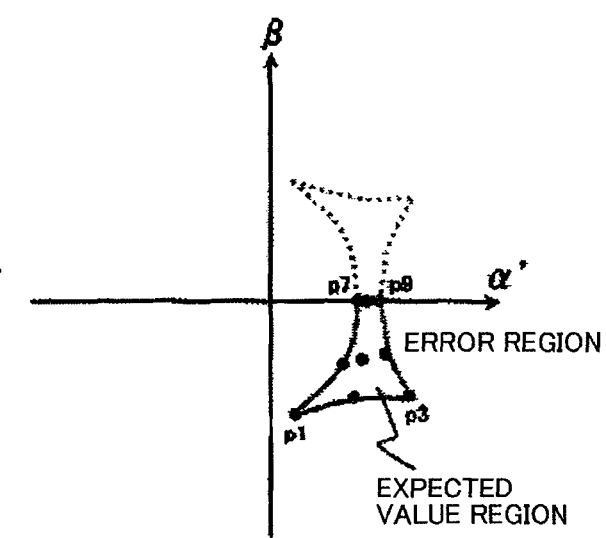
FIG. 16B is a diagram illustrating a region formed by calculated values α' and β.

FIGS. 16A and 16B are diagrams for describing the ranges of values calculated in this embodiment. FIG. 16A is a diagram for describing a region formed by the value $\alpha$ calculated from Formula 3 and the value $\beta'$ calculated from Formula 11. FIG. 16B is a diagram for describing a region formed by the value $\beta$ calculated from Formula 4 and the value $\alpha'$ calculated from Formula 12. When the position of the newly detected coordinates is located within the X and Y coordinate ranges of the region I, the value $\alpha$ calculated from Formula 3 and the value $\beta'$ calculated from Formula 11 fall within a region (hereinafter, referred to as expected value region) surrounded by the solid line illustrated in FIG. 16A. Further, when the X coordinate has moved but the Y coordinate stays within the range (region IV), the values fall within an expected value region surrounded by the dotted line. Here, when only the X coordinate has moved so that the actual point of contact is located in the region IV, the control to be performed in the X-directional detection processing is the same as that shown in FIG. 8. Thus, no problem arises in acquiring the value $\alpha$.

On the other hand, when the position of the newly detected coordinates is located outside the Y coordinate range of the region I, the values fall outside the expected value regions. In this case of being outside the expected value regions, the presence of an error is concluded (P-18). Thus, the vertical region range (V) is updated (P-22), and then the X-directional detection processing is performed again for this region (P-17). In this case, the vertical region range (V) is updated from the first region range (regions I and IV) to the second region range (regions II and III). Then, detection is performed for the second region range. In this case, the control in the X-directional detection processing is performed in correspondence to the region I or III as shown in FIG. 8.

Here, this embodiment has been described for a case where the number of region ranges in the Y axis direction is two. However, in a case where electrode terminals in number (four or greater) exceeding three are provided in each vertical side and hence three or more vertical region ranges are present, the vertical region range (V) is updated until an expected value region prepared for each region range agrees with the detection result (α, β'). As a result, the vertical region range (V) of a region in which the coordinates to be detected are located can be specified. Further, for the value β' in each region range, a formula corresponding to each region range is used.

Next, the Y-directional detection processing is described below. After the completion of the X-directional detection processing, Y-directional detection processing is performed in accordance with the region stored in the region storage section 211 (P-19). For example, when the result (α, β') of the X-directional detection processing falls within the expected value region of the region I, the data stored in the region storage section 211 is the region I (further, the vertical region range is the first region range), that is, unchanged. Thus, the Y-directional detection processing is also controlled in correspondence to the region I. In this case, for the purpose of determination whether or not the position of the newly detected coordinates has moved to the outside (regions III and IV) of the X coordinate range of the region I, a new value α' calculated from Formula 12 (in the case of regions I and II) is used.

$$\alpha'=(i4+i8)/(i1+i3+i4+i8)-B4 \qquad \text{Formula 12}$$

When the position of the newly detected coordinates is located within the X and Y coordinate ranges of the region I, the value β calculated from Formula 4 and the value α' calculated from Formula 12 fall within an expected value region surrounded by the solid line illustrated in FIG. 16B. Further, when the Y coordinate has moved but the X coordinate stays within the range (region II), the values fall within an expected value region surrounded by the dotted line. Here, when only the Y coordinate has moved so that the actual point of contact is located in the region II, the control to be performed in the Y-directional detection processing is the same as that shown in FIG. 8. Thus, no problem arises.

On the other hand, when the position of the newly detected coordinates is located outside the X coordinate range of the region I, the values fall outside the expected value regions. In this case of being outside the expected value regions, the presence of an error is concluded (P-20). Thus, the horizontal region range (H) is updated (P-23), and then the Y-directional detection processing is performed again for this region (P-19). In this case, the horizontal region range (H) is updated from the first region range (regions I and II) to the second region range (regions III and IV). Then, detection is performed for the second region range. In this case, the control in the Y-directional detection processing is performed in correspondence to the region III or IV as shown in FIG. 8.

Here, this embodiment has been described for a case where the number of region ranges in the X axis direction is two. However, in a case where four or more electrode terminals are provided in each horizontal side and hence three or more horizontal region ranges are present, the horizontal region range (H) is updated until an expected value region prepared for each region range agrees with the detection result (α', β). As a result, the horizontal region range (H) of a region in which the coordinates to be detected are located can be specified.

By virtue of the above-mentioned control, new XY coordinates can be calculated on the basis of the error-free result α of the X-directional detection processing and the error-free result β of the Y-directional detection processing. Further, the region is updated (P-21) in accordance with the results of the X-directional detection processing and Y-directional detection processing described above, and then this region is adopted as the region initial value in the next continuous detection.

Further, in this embodiment, when the result of the X-directional detection processing performed on the basis of the preceding region detection result (region I) falls within the expected value region of the region IV, the region may be updated from the region I to the region IV at that time (not shown). As such, when the horizontal region range (H) can be identified in a stage of the X-directional detection processing, the error determination processing may be omitted in the Y-directional detection processing illustrated in FIG. 15.

Figure 17:
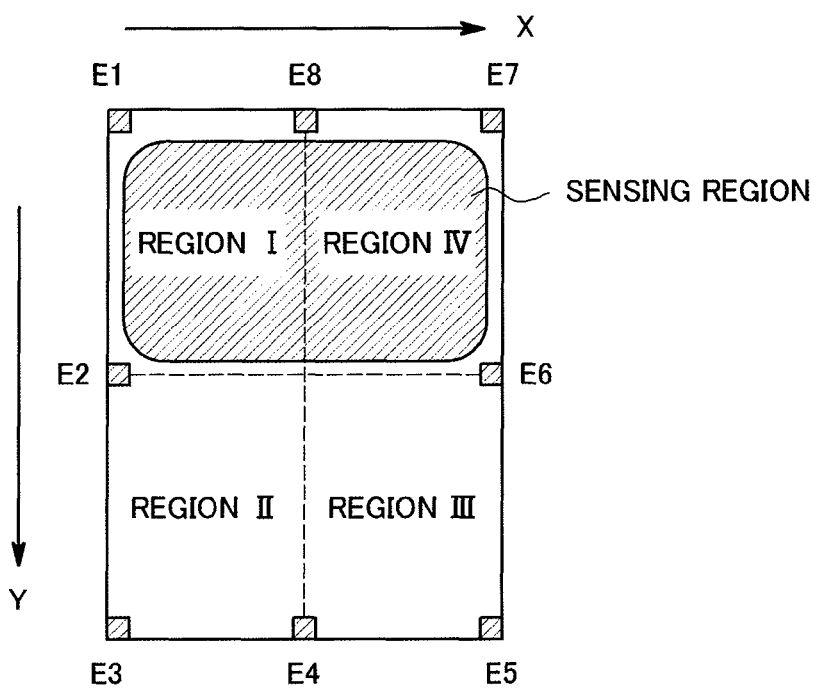
FIG. 17 is an explanatory diagram for a case where a sensing region on the detection transparent conductive film is restricted by a system.

Further, as illustrated in FIG. 17, when the sensing region on the detection transparent conductive film is to be restricted by the system, a region range in which determination is to be repeated in the flow of FIG. 15 may be specified by the system. Then, when an error-free result is not obtained within the region range specified by the system, a result of absence of detection information may be sent to the system. In the case of a sensing region as illustrated in FIG. 17, implementation may be such that the vertical direction is assigned as the first region range, while the horizontal direction is assigned as the first or second region range.

Further, the mechanism of determining whether or not the detection transparent conductive film has received any input is assumed to be provided in the touch panel control circuit. Then, the flow control as illustrated in FIG. 5 or 15 is activated when the mechanism concludes the presence of an input.

According to the second embodiment, too, the on-screen input display device can be provided in which the detection resolution is improved in the electrostatic capacity coupling type touch panel that employs the transparent conductive film serving as the detection film.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An on-screen input image display system, comprising:
a touch panel for detecting two-dimensional coordinates of a touch position located on a display screen of a display device, the touch panel comprising a plurality of electrode terminals such that at least eight electrode terminals are aligned with one electrode terminal in each of the four corners and four center portions such that there are at least three electrode terminals on each side of the touch panel; and
a touch panel control circuit for selecting two or four electrode terminals from among the plurality of electrode terminals, and then applying an AC signal through a current detection resistor and detecting a current that flows through each of the selected electrode terminals,
wherein coordinate detection is performed in two separate periods so that in a first period of the two separate periods, a touch in one of four regions is detected by selecting terminals at four corners from among the plurality of electrode terminals, and in a second period of the two separate periods, coordinates are detected by controlling electrodes selected in accordance with the region detected in the first period;
wherein in X-directional detection processing, the coordinate detection is performed by selecting one or two electrode terminals in each of two sides vertically facing each other such that the region identified on the basis of coordinate detection results obtained in the first period is included; and
in Y-directional detection processing, the coordinate detection is performed by selecting one or two electrode terminals in each of two sides horizontally facing each other such that the region identified on the basis of the coordinate detection results obtained in the first period is included.

2. An on-screen input image display system according to claim 1, wherein the X-directional detection processing for detecting a horizontal coordinate and the Y-directional detection processing for detecting a vertical coordinate are repeated to thereby continuously perform the coordinate detection.

3. An on-screen input image display system according to claim 2, wherein:

in the X-directional detection processing, a touched region is determined by comparing a result of current detection obtained by selecting the electrode terminals in accordance with the region identified on the basis of the coordinate detection results obtained in the first period; and in the Y-directional detection processing, the touched region is determined by comparing a result of current detection obtained by selecting the electrode terminals in accordance with the region identified on the basis of the coordinate detection results obtained in the first period.

4. An on-screen input image display system according to claim 3, wherein, in the touch panel, the X-directional detection processing and the Y-directional detection processing are controlled in accordance with sensor areas defined in advance.

5. An on-screen input image display system according to claim 1, wherein the touch panel is an electrostatic capacity coupling type touch panel employing a detection transparent conductive film arranged on a display screen of the display device.

* * * * *